United States Patent
Mohan

(10) Patent No.: US 11,638,120 B2
(45) Date of Patent: Apr. 25, 2023

(54) SYSTEM AND METHOD FOR TRACKING LOW POWERED BEACON TAGS

(71) Applicant: Building Robotics, Inc., Oakland, CA (US)

(72) Inventor: Tanuj Mohan, Mountain View, CA (US)

(73) Assignee: Building Robotics, Inc., Santa Clara, CA (US)

( * ) Notice: Subject to any disclaimer, the term of this patent is extended or adjusted under 35 U.S.C. 154(b) by 0 days.

(21) Appl. No.: 17/002,846

(22) Filed: Aug. 26, 2020

(65) Prior Publication Data

US 2022/0070618 A1 Mar. 3, 2022

(51) Int. Cl.
*H04W 4/029* (2018.01)
*H04W 4/33* (2018.01)

(52) U.S. Cl.
CPC ............. *H04W 4/029* (2018.02); *H04W 4/33* (2018.02)

(58) Field of Classification Search
None
See application file for complete search history.

(56) References Cited

U.S. PATENT DOCUMENTS 6,765,484 B2 * 7/2004 Eagleson ........... G06K 17/0022
340/505
2017/0213057 A1 7/2017 Primm et al.

FOREIGN PATENT DOCUMENTS

EP 3680687 7/2020

OTHER PUBLICATIONS

Qingzhi Liu, "Beh: Indoor Batteryless BLE Beacons Using RF Energy Harvesting for Internet of Things", EEMCS, Delft University of Technology, The Netherlands, INF, Wageningen University, The Netherlands, Nov. 8, 2019, 18 pages.
"First Battery-Free Bluetooth Sticker Sensor Tag Demonstrated at NRF," Wiliot Press Release, NRF, Jan. 14, 2019, 4 pages.
PCT Search Report dated Oct. 15, 2021, for PCT Application No. PCT/US2021/038577, 12 pages.

* cited by examiner

*Primary Examiner* — Adolf Dsouza

(57) ABSTRACT

There is described a system for tracking beacon tags comprising a communication component and a processor. The communication component receives a beacon from a beacon tag and transmit an acknowledgment of the beacon. The processor identifies a tag characteristic associated with the beacon tag and generates a tag instruction based on the tag characteristic. The tag instruction includes a beaconing rate for the beacon tag, and the acknowledgment includes the tag instruction. There is also described a beacon tag for operating with a tracking system comprising a communication component and a processor. The communication component transmits a first beacon, receive an acknowledgment associated with the beacon, and transmit a second beacon from the beacon tag based on an adjusted beaconing rate. The processor identifies a tag instruction of the acknowledgment and adjusts the beaconing rate of the beacon tag based on the tag instruction.

14 Claims, 8 Drawing Sheets

SYSTEM AND METHOD FOR TRACKING LOW POWERED BEACON TAGS

FIELD OF THE INVENTION

This application relates to the field of location determination of beacon tags and, more particularly, to a system for determining a location of a beacon tag within an indoor facility.

BACKGROUND

Building management systems encompass a wide variety of systems that aid in the monitoring and control of various aspects of building operation. Building management systems include security systems, fire safety systems, lighting systems, and heating, ventilation, and air conditioning ("HVAC") systems. HVAC systems are sometimes referred to as "environment control systems" because these systems control the environmental conditions within a building.

Building management systems may provide "intelligence" about building occupants to facilitate control of the building equipment. That is, based on behavior or predicted behavior of users within the building, the system may provide building operators and maintenance personnel with enhanced environmental, safety, logistical, and/or information control. Such user behavior may include the location of people within particular areas of a building, which may be utilized by the building management system to enhance control of the environmental conditions of the building or optimize the flow of people through the space. The intelligence might extend to assets that are moving in the space with data gathered to optimize the flow of assets, create alerts based on position, count and or time events.

Tracking systems may include sensors positioned throughout indoor locations and allow a tag to transmit beacons to the sensors. Beacon tags are typically used for wayfinding and proximity detection and such devices require a source of power. Conventional beacon tags include batteries in order to power the circuits needed to generate the beacons. Such beacon tags require replacement of the batteries or eventual disposal of the tag. Other conventional beacon tags utilize battery-free energy harvesting technologies to provide energy to the circuits of the device so that the device may perform simple operations, such as transmitting low power beacons. Existing energy harvesting solutions include solar panels for harvesting indoor/outdoor lighting and kinetic energy collectors for harvesting movements of wind, water waves, machinery vibration, or human motion. Some device utilize radio frequency (RF) harvesting technologies to convert radio energy collected proximal to the device. An example of a conventional energy harvesting circuit is the battery-free Bluetooth sensor tag available from Wiliot Ltd. at San Diego, Calif.

Whether with batteries or with low-power battery-free energy harvesting, conventional beacon tags have their challenges. For one, the signals transmitted by the beacon tags may be subject to collision of cross-traffic due to the high density of beaconing in such environments. The dense quantity of transmitting beacon tags can result in certain beacon signals failing to reach or to be properly received by sensors due to low signal level or cross-traffic of transmitted beacon signals, resulting in inaccurate or inconsistent device tracking by the conventional systems. Such density and cross-traffic from beacon tags present location and tracking difficulties for current location determination systems to identify and track a specific beacon tag in such a dense signaling environment. Also, the periodic beaconing by a beacon tag can drain the power source of the beacon tag. For example, a battery-free energy harvesting beacon tag may require movement or positioning of the beacon tag to harvest energy from its surrounding environment and transmit at low power levels. Thus, the performance and energy efficiency of conventional beacon tags lack the operational convenience that many users desire.

SUMMARY

In accordance with one embodiment of the disclosure, there is provided an energy management approach for a building management system. In particular, approach provides a system and method for tracking beacon tags as well as a beacon tag, and method thereof, for operating with the tracking system. The system manages communications between beacon tags carried by users and sensors positioned within a building to maximize the performance, and minimize the energy consumption, of the beacon tags. Likewise, each beacon tag also performs device functions to maximize performance and minimize energy consumption. The system, device, and methods described herein are applicable to a variety of energy generating and/or storage technologies, including battery-free, energy harvesting beacon tags. Regardless of the technology utilized, the approach enables beacon tags to operate more energy efficiently as well as reduce density and associated cross-traffic issue for transmitted beacons within a given area. The approach further enables sensors of a given system to detect and acknowledge beacon signals from the beacon tags, even those device having low powered communication circuitry.

One aspect is a system for tracking beacon tags comprising a communication component and a processor coupled to the communication component. The communication component is configured to receive a beacon from a beacon tag and transmit an acknowledgment of the beacon. The processor identifies a tag characteristic associated with the beacon tag in response to receiving the beacon and generates a tag instruction based on the tag characteristic. The tag instruction includes a beaconing rate for the beacon tag, and the acknowledgment includes the tag instruction.

Another aspect is a method for tracking beacon tags. A beacon is received from a beacon tag. A tag characteristic associated with the beacon tag is identified in response to receiving the beacon. A tag instruction based on the tag characteristic is generated, in which the tag instruction includes a beaconing rate for the beacon tag. An acknowledgment of the beacon is transmitted in which the acknowledgment includes the tag instruction.

Yet another aspect is a beacon tag for operating with a tracking system comprising a communication component and a processor coupled to the communication component. The communication component is configured to transmit a first beacon, receive an acknowledgment associated with the beacon, and transmit a second beacon from the beacon tag based on an adjusted beaconing rate. The processor identifies a tag instruction of the acknowledgment in response to receiving the acknowledgment and adjusts the beaconing rate of the beacon tag based on the tag instruction.

Still another aspect is a method of a beacon tag for operating with a tracking system. A first beacon is transmitted from the beacon tag. An acknowledgment associated with the beacon is received. A tag instruction of the acknowledgment is identified in response to receiving the acknowledgment. A beaconing rate of the beacon tag is adjusted based on the tag instruction. A second beacon is transmitted from the beacon tag based on the adjusted beaconing rate.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
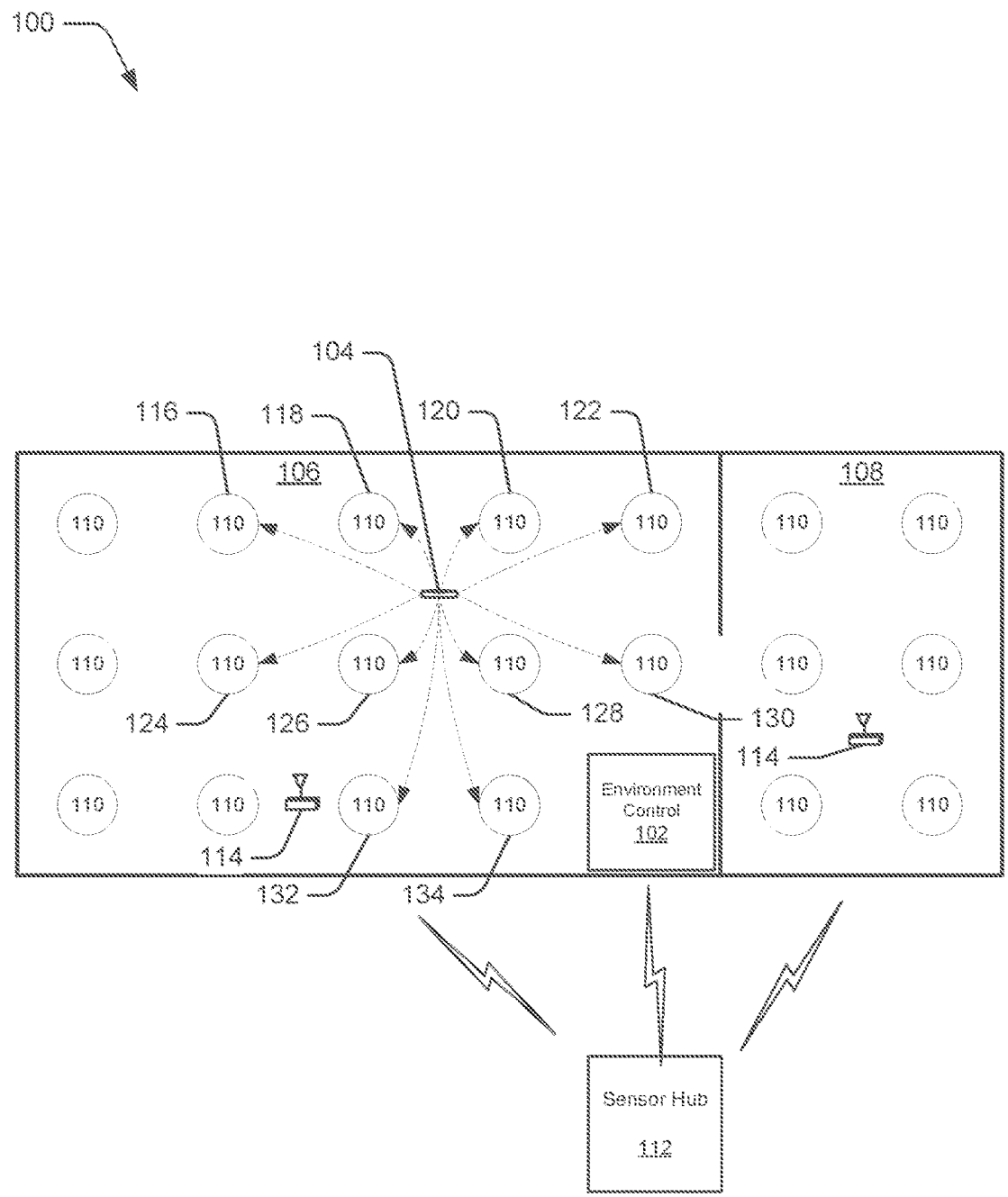
FIG. 1 is an illustration of an environment in an example implementation that is operable to employ techniques described herein.

Various technologies that pertain to systems, devices, and methods that facilitate energy management for tracking of beacon tags will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Referring to FIG. 1, a tracking system 100 provides information to an environment control system 102 of the facility so that the environment control system may manage one or more environmental conditions of the facility. The system may manage the environmental conditions based at least in part on the locations of beacon tags 104, and an occupant or asset associated with the beacon tag.

The tracking system 100 includes an infrastructure 110, 112, 114 to establish locations of one or more beacon tags 104 within a facility, such as an indoor structure or defined space. The facility may include various partitioned or designated areas 106, 108 of the facility, such as floors, rooms, hallways, or defined open areas associated with the facility. Each area 106, 108 of the facility may include devices of the infrastructure such as one or more sensors 110. For some embodiments, a sensor hub 112 of the infrastructure may be co-located with some or all sensors within an area 106, 108 of the facility but, for other embodiments, the sensor hub may be remote from the sensors and/or the facility. For example, the sensor hub 112 may be located in the Cloud and communicate directly or indirectly with the sensors 110, at least in part, via the Internet or other communication network. The sensor hub 112 communicates directly or indirectly with the sensors 110 and the interconnection between the sensor hub 112 and the sensors may include wired and/or wireless connections. For example, the tracking system 100 may optionally include wired or wireless gateways 114 positioned among the sensors 110 at the facility in which the wired or wireless gateways may serve as a communication transponder between the sensor hub 112 and the sensors. Similar to the sensors 110 and the sensor hub 112, the gateways 114 may also process data to employ techniques described herein.

The sensors 110 of the infrastructure may be positioned at fixed locations throughout the area. The sensors 110 may be evenly distributed throughout each area 106, 108 or selectively distributed in a non-even manner, as may be preferred for beacon tag detection. The sensors 110 are configured to detect beacons broadcast by one or more sources associated with positions of occupants. In particular, occupants may carry the beacon tags 104 for detection by the sensors 110, among other purposes, to facilitate location detection of the devices. Each of the beacon tags 104 may be any type of transportable device capable of wireless communication with sensors 110 of the facility. Examples of beacon tags 104 include, but are not limited to, tags, wearables, wireless communication devices, tablets, portable computing devices, and any other type of transportable device including circuitry for transmitting a beacon.

A beacon tag 104 may broadcast a beacon to sensors 116-134 in proximity to the device. For the example shown in FIG. 1, the broadcast beacon transmitted by the beacon tag 112 may be received by the sensors 118, 120, 126, 128 located closest to the device. Also, for this example, the broadcast beacon may be received by other sensors 116, 122, 124, 130-134, in addition to the closest sensors 118, 120, 126, 128, in proximity to the beacon tag 112. The broadcast range of the beacon tag 112 for transmitting the broadcast beacon may be limited by the capabilities of the device, such as power and energy storage, as well as the proximity of the device to the sensors 110 in view of distance and any obstructions therebetween. A power source of the beacon tags 104 may be drained by this periodic beaconing. Also, multiple beacon tags may transmit broadcast beacons to the same sensor or sensors 110 in proximity to the devices, thus causing collision of cross-traffic due to the high density of beaconing, which may be significant problem for low power transmissions.

For at least some embodiments, the tracking system 100 may manage one or more environment control systems 102 associated with the facility based on the determined locations of the beacon tags 104. In particular, the sensor hub 112 may provide control signals to an environment control system 102 via a wired connection, wireless connection, or a combination of wired and wireless connections. The environment control system 102 may manages an environmental condition of the facility based, in whole or in part, on the locations corresponding to the beacon tags. Environmental conditions managed by the environment control system 102 include, but are not limited to, heating ventilation air conditioning ("HVAC") conditions, lighting conditions, safety conditions, and security conditions. For example, areas of the facility where occupants are not detected may have lights dimmed or inactivated. Also, an HVAC system associated with a particular area may adjust ambient temperatures based on the occupancy and/or location of occupants as detected by the tracking system 100.

The beacon tags 104 (whether battery operated or battery-free RF harvesting tags) and the system for tracking them work (such as the infrastructure) cooperatively to lower the beacon signal traffic density in one or more areas while maximizing the performance, such as accuracy, of the tracking system. The beacon tags include a beacon transceiver and a logic circuit/program that enable the beacon tag to receive and process an acknowledgment signal of a beacon transmission from a fixed sensor in proximity to the beacon tag. The fixed sensor also includes a beacon transceiver and a logic circuit/program that enable the fixed sensor to not only receive and process a beacon transmission from a particular beacon tag but, in response, send an acknowledgment signal from the fixed sensor to the beacon tag such that the beacon tag can adjust or modify its periodic beacon transmission. As a result, the system and beacon tags save energy and reduce battery consumption or RF harvested energy in the case of battery-free beacon tags. The system and beacon tags also diminishes the density of beacon tags needed to transmit in proximity to a given fixed sensor.

Figure 2:
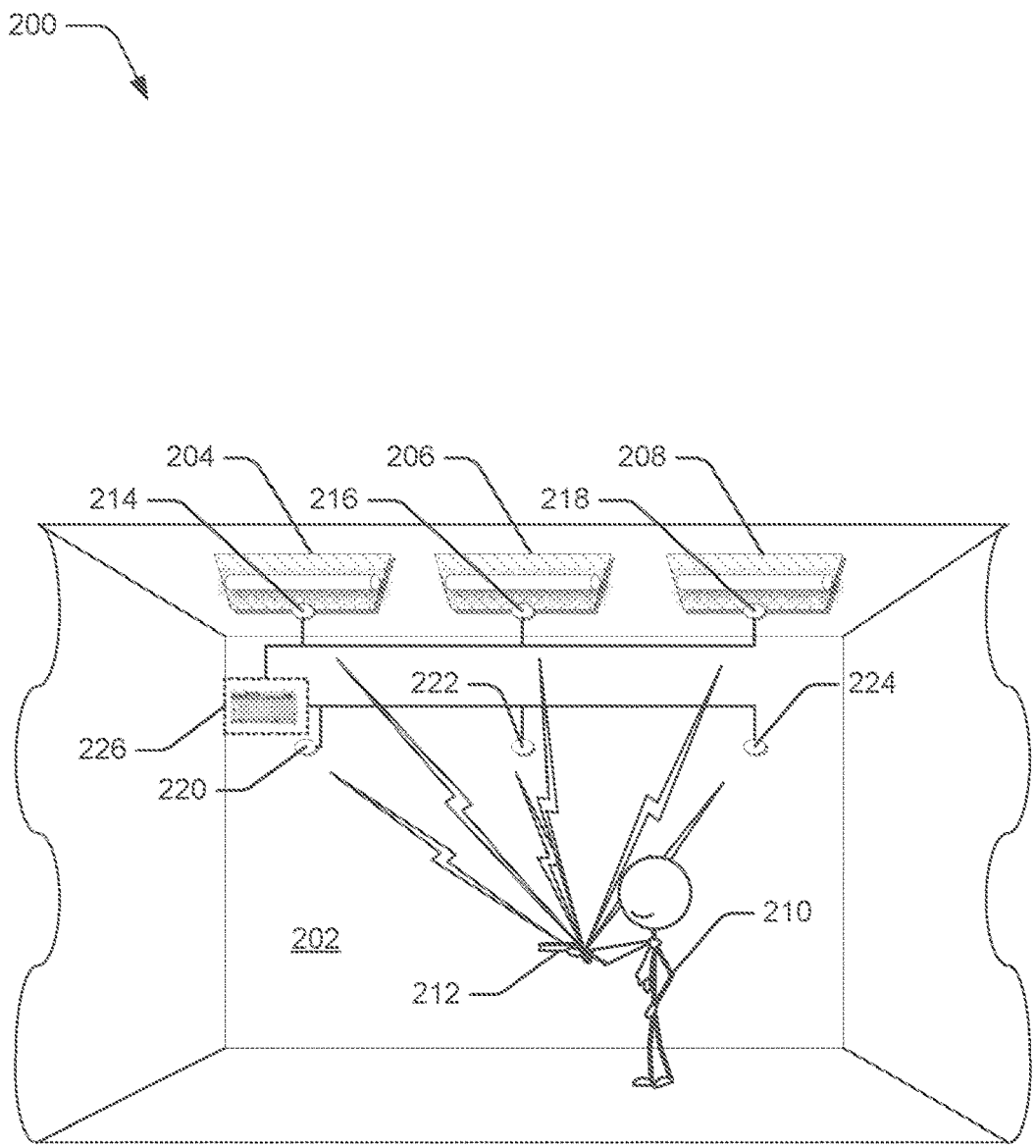
FIG. 2 a cut-away, side planar view of an example area illustrating an aspect of the system described herein, particularly from the view of a user.

Referring to FIG. 2, there is shown an example implementation 200 as applied to an area 202 of the facility to illustrate an aspect of the tracking system 100. For the example implementation 200, environmental devices, such as light fixtures 204-208, are installed at ceiling of the area 202. Examples of environmental devices include, but are not limited to, light fixtures 204-208, air vents, window blinds/shades, smoke detectors, security cameras, and the like. The example implementation 200 also shows an occupant 210 of the facility and a beacon tag 212 associated with the occupant. For example, the beacon tag 212 may be carried, supported, or otherwise co-located with the occupant 210 such that the location of the beacon tag may be associated with the location of the occupant.

In addition to the environmental devices, the area 202 includes sensors 214-224 positioned at various locations of the area. For example, as shown in FIG. 1, some sensors 214-218 may be fixed or otherwise positioned at a ceiling of the area 202, and other sensors 220-224 may be fixed or otherwise positioned at a wall of the area. Also, sensors 214-218 may be co-located or adjacent to environmental devices and/or sensors 220-224 may be positioned independent of the environmental devices. The tracking system 100 may optionally include one or more wired or wireless gateways 226 positioned among the sensors 214-224 at the facility in which each wired or wireless gateways may serve as a communication transponder between the sensor hub 112 and select sensors. The sensors 214-224 may have locations at the ceiling, walls, and other parts of the area 202 of the facility so that the sensors may receive broadcast beacons from beacon tags 212 in proximity to the sensors.

Figure 3:
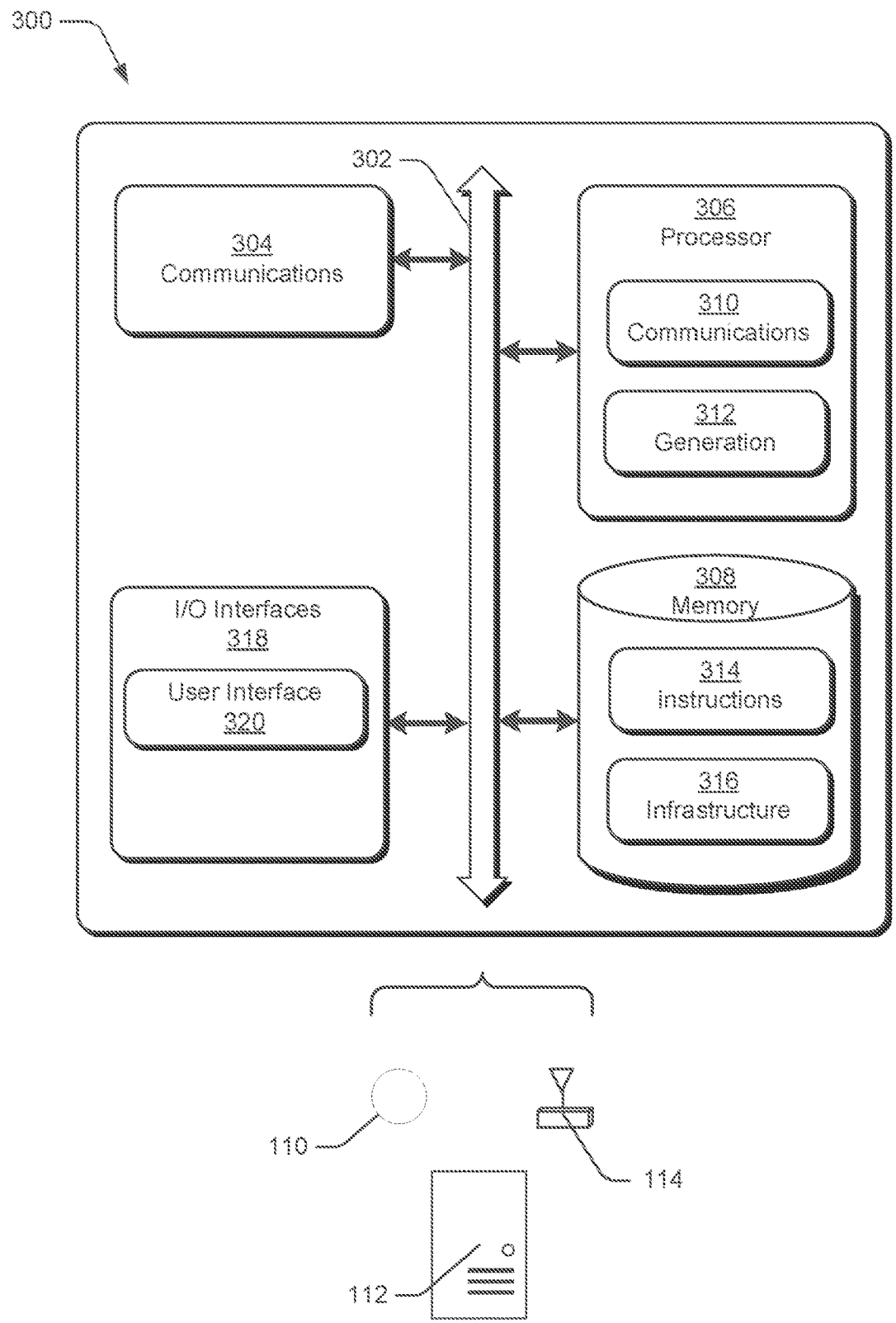
FIG. 3 is a block diagram of an example implementation of an infrastructure device of FIG. 1.

FIG. 3 represents example device components 300 of a system, such as an infrastructure device 110, 112, 114, of the tracking system 100 for tracking beacon tags 104. An example of an infrastructure device includes, but is not limited to, a sensor 110, a sensor hub 112, or a gateway 114. The device components 300 of the infrastructure device comprise a communication bus 302 for interconnecting the other device components directly or indirectly, one or more communication components 304 communicating with other entities via a wired or wireless network, one or more processors 306, and one or more memory components 308.

The communication component 304 is configured to receive a beacon from a beacon tag, transmits an acknowledgment of the beacon in which the acknowledgment includes the tag instruction, and collect data from one or more infrastructure devices. The communication component 304 may utilize wireless technology for communication, such as, but are not limited to, ultrawide band (UWB), Bluetooth (including BLE), Wi-Fi (including Wi-Fi Direct), Zigbee, Z-Wave, 6LoWPAN, Near-Field Communication, other types of electromagnetic radiation of a radio frequency wave, light-based communications (including infrared), acoustic communications, and any other type of peer-to-peer technology. For some embodiments, the communication component 304 of the device components 300 may also utilize wired technology for communication, such as transmission of data over a physical conduit, e.g., an electrical cable or optical fiber cable.

The processor 306 may execute code and process data received other components of the device components 300, such as information received at the communication component 304 or stored at the memory component 308. The code associated with the tracking system 100 and stored by the memory component 308 may include, but is not limited to, operating systems, applications, modules, drivers, and the like. An operating system includes executable code that controls basic functions of the infrastructure device, such as interactions among the various components of the device components 300, communication with external devices via the communication component 304, and storage and retrieval of code and data to and from the memory component 308.

Each application includes executable code to provide specific functionality for the processor 306 and/or remaining components of the infrastructure device. Examples of applications executable by the processor 306 include, but are not limited to, a communications module 310 to identify a tag characteristic associated with the beacon tag in response to receiving a beacon from a beacon tag, and a generation module 312 to generate a tag instruction based on the tag characteristic. The communications module 310 may identify the tag characteristic based on the beacon, data collected from the infrastructure device(s), or both.

Data stored at the memory component 308 is information that may be referenced and/or manipulated by an operating system or application for performing functions of the infrastructure device. Examples of data associated with the tracking system 100 and stored by the memory component 308 may include, but are not limited to, instruction data 314 having a tag instruction that includes a beaconing rate for the beacon tag and infrastructure data 316 having a tag characteristic based on the beacon, data collected from the infrastructure device(s), or both. For some embodiments, the tag instruction may include, but is not limited to, one or more of the following: a location of the beacon tag, a motion data associated with the beacon tag, or a power level of the beacon tag. For some embodiments, the tag characteristic may include, but is not limited to, one or more of the following: a tag location within a proximal range of a designated area, a tag location outside of a proximal range of the designated location, a tag motion below a threshold motion level, or a tag power below a threshold power level.

The device components 300 of each infrastructure device 110, 112, 114 may include one or more input and/or output components, i.e., I/O interfaces 318. The I/O interfaces 318 of the device components 300 may include one or more visual, audio, mechanical, and/or other components. For some embodiments, the I/O interfaces 318 of each infrastructure device 110, 112, 114 may include a user interface 320 for interaction with a user of the device. The user interface 320 may include a combination of hardware and software to provide a user with a desired user experience. For example, the user interface 332 may include one or more input components to allow the user to enter information, such as mechanical buttons or an audio input, and one or more output components to provide information to the user, such as a visual or audio indicator to show an operational status of the infrastructure device.

The device components 300 may further comprise a power source 334, such as a power supply or a portable battery, for providing power to the other device components 300 of each infrastructure device 110, 112, 114 of the tracking system 100.

It is to be understood that FIG. 3 is provided for illustrative purposes only to represent examples of the device components 300 of an infrastructure device 110, 112, 114 and is not intended to be a complete diagram of the various components that may be utilized by the device. Therefore, infrastructure device 110, 112, 114 may include various other components not shown in FIG. 3, may include a combination of two or more components, or a division of a particular component into two or more separate components, and still be within the scope of the present invention.

Figure 4:
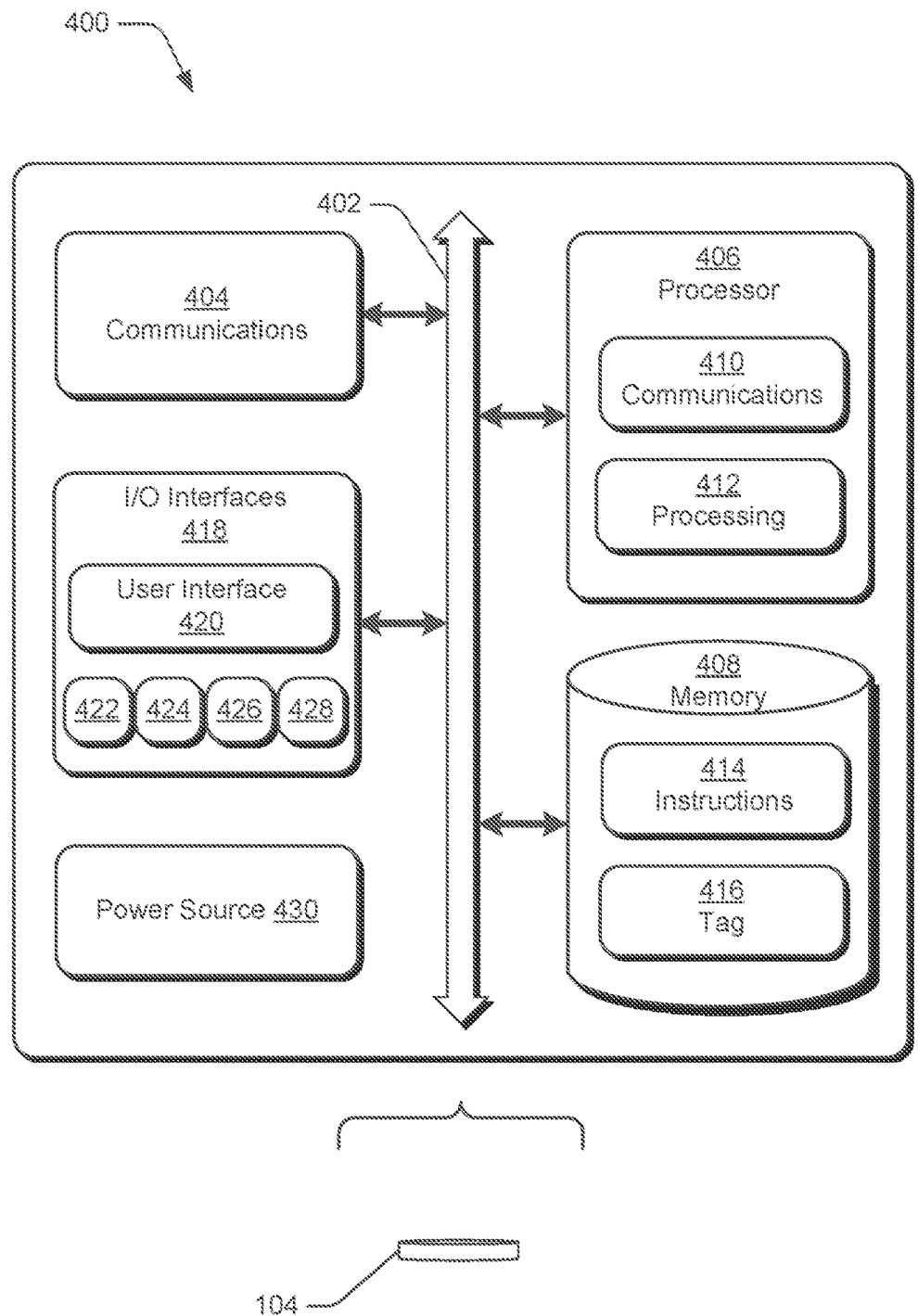
FIG. 4 is a block diagram of an example implementation of a beacon tag of FIG. 1.

FIG. 4 represents example device components 400 of the beacon tag 104 for operating with the tracking system 100. An example of a beacon tag 104 includes, but is not limited to, a tag, a wearable, a wireless communication device, a tablet, a portable computing device, and any other type of transportable device having wireless communication capabilities. The device components 400 of the beacon tag 104 comprise a communication bus 402 for interconnecting the other device components directly or indirectly, one or more communication components 404 communicating other entities via a wired or wireless network, one or more processors 406, and one or more memory components 408.

The communication component 404 is configured to transmit a first beacon from the beacon tag 104, receive an acknowledgment associated with the beacon, and transmits a second beacon from the beacon tag based on the adjusted beaconing rate. The first beacon may be transmitted based on a first beaconing rate, and the second beacon may be transmitted based on a second beaconing rate different from the first beaconing rate. The communication component 404 may utilize wireless technology for communication. Examples of the wireless technology include, but are not limited to, ultrawide band (UWB), Bluetooth (including BLE), Wi-Fi (including Wi-Fi Direct), Zigbee, Z-Wave, 6LoWPAN, Near-Field Communication, other types of electromagnetic radiation of a radio frequency wave, light-based communications (including infrared), acoustic communications, and any other type of peer-to-peer technology. For some embodiments, the communication component 404 of the device components 400 may also utilize wired technology for communication, such as transmission of data over a physical conduit, e.g., an electrical cable or optical fiber cable.

Each beacon tag 104 may transmit a broadcast beacon in response to signals received from one or more components of the device. For example, the beacon tag 104 may transmit the broadcast beacon in response to a periodic signal from a timing circuit, an activity signal from an internal sensor (such as a motion sensor), an environment signal from an environmental sensor, an external signal from a communication component, or a combination of factors based on information received from more than one component. The signals received from the other component(s) may establish operations to conserve energy, enhance performance, and/or serve other purposes for the beacon tag 104.

The processor 406 may execute code and process data received at other components of the device components 400, such as information received at the communication component 404 or stored at the memory component 408. The code associated with the tracking system 100 and stored by the memory component 408 may include, but is not limited to, operating systems, applications, modules, drivers, and the like. An operating system includes executable code that controls basic functions of the beacon tag 104, such as interactions among the various components of the device components 400, communication with external devices via the communication component 404, and storage and retrieval of code and data to and from the memory component 408.

Each application includes executable code to provide specific functionality for the processor 406 and/or remaining components of the beacon tag 104. Examples of applications executable by the processor 406 include, but are not limited to, a communications module 410 to manage communications transmitted to and received from an infrastructure device 110, 112, 114, and a processing module 412 to identify a tag instruction of an acknowledgment in response to receiving the acknowledgment and adjusting a beaconing rate of the beacon tag 104 based on the tag instruction. For some embodiments, the processing module 412 of the processor 406 adjusts the beaconing rate by generating a second beaconing rate that is greater or less than the first beaconing rate based on the tag instruction. For some embodiments, the processing module 412 of the processor 406 adjusts the beaconing rate by minimizing the beaconing rate based on one or more of the following: a time period monitored by a timer of the tag, an internal motion signal provided by a motion sensor of the tag, or an external motion signal provided by the tag instruction.

Data is information that may be referenced and/or manipulated by an operating system or application for performing functions of the beacon tag 104. Examples of data associated with the tracking system 100 and stored by the memory component 408 may include, but are not limited to, an instructions data 414 having a tag instruction that includes a beaconing rate for the beacon tag, and a tag data 416 having a tag characteristic of the beacon tag 104. For some embodiments, the tag instruction may include, but is not limited to, one or more of the following: a location of the beacon tag, a motion data associated with the beacon tag, or a power level of the beacon tag. For some embodiments, the tag instruction may be based on one ore more of the following: a tag location within a proximal range of a designated area, a tag location outside of a proximal range of the designated location, a tag motion below a threshold motion level, or a tag power below a threshold power level.

The device components 400 of each beacon tag 104 may further comprise one or more input and/or output components, i.e., I/O interfaces 418. The I/O interfaces 418 of the device components 400 may include one or more visual, audio, mechanical, and/or other components. The I/O interfaces 418 of each beacon tag 104 may comprise a user interface 420 for interaction with a user of the beacon tag 104. The user interface 420 may include a combination of hardware and software to provide a user with a desired user experience. For example, the user interface 420 may include one or more input components to allow the user to enter information, such as mechanical buttons or an audio input, and one or more output components to provide information to the user, such as a visual or audio indicator to show an operational status of the infrastructure device. The I/O interfaces 418 may also manage sensed data received directly or indirectly from other devices. Examples of the sensed data managed by the I/O interfaces 418 may include, but are not limited to, lighting 422, motion 424 (such as an accelerometer), temperature 426, imaging 428, and air quality data associated with the infrastructure device.

The device components 400 may further comprise a power source 430, such as a power supply, a portable battery, or energy harvesting component, for providing power to the other device components 400 of each beacon tag 104 of the tracking system 100. For embodiments with an energy harvesting component, an RF harvesting device may be included to provide an energy harvesting circuit and a data transceiver. The circuit may receive ambient RF energy and generates power for the transceiver. In particular, the circuit may convert the collected RF energy into direct current (DC), via rectification or other means, and stores the harvested energy until needed by the transceiver.

It is to be understood that FIG. 4 is provided for illustrative purposes only to represent examples of the device components 400 of a beacon tag 104 and is not intended to be a complete diagram of the various components that may be utilized by the device. Therefore, beacon tag 104 may include various other components not shown in FIG. 4, may include a combination of two or more components, or a division of a particular component into two or more separate components, and still be within the scope of the present invention.

Figure 5:
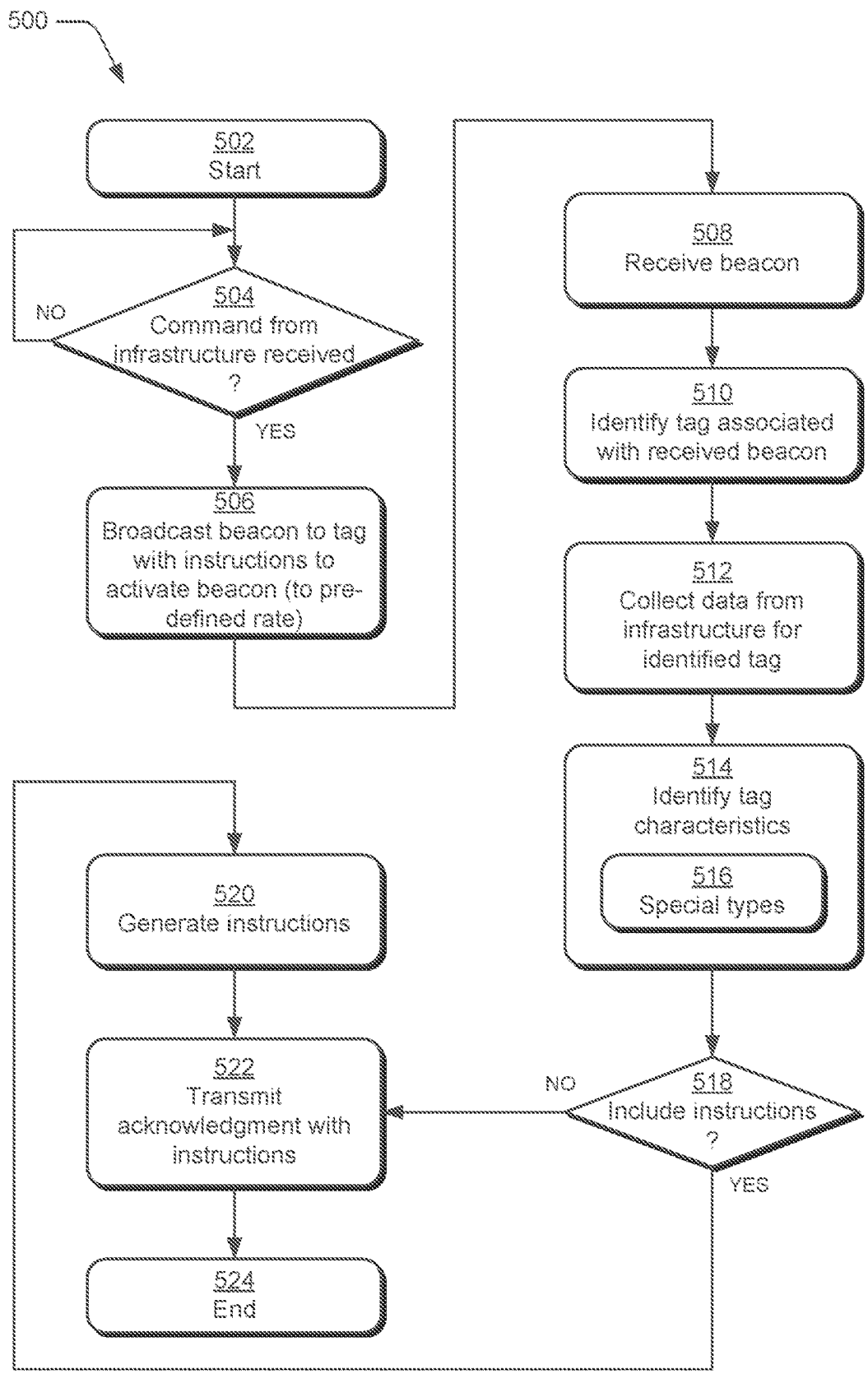
FIG. 5 is a flow diagram of an example implementation of an infrastructure operation.

Referring to FIG. 5, there is shown a flow diagram representing an example system operation 500 of a system and corresponding infrastructure for tracking beacon tags. As stated above, the infrastructure may be a sensor 110, a sensor hub 112, a gateway 114, or a combination of two or more devices. The system operation 500 may be initiated by commissioning, operation, other activation by a device, system, or entity (502). The infrastructure of the system 100 may determine whether to send a command or otherwise enable adjustable beaconing rates, at one or more beacon tags, particularly devices with very low power operation, within proximity to fixed beacon sensors in a building (504). For some embodiments, the beacon tag 104 may be active, i.e., broadcast beacons, within one or more designated areas 106, 108 and inactive beyond the areas. In response to the command (504), the infrastructure may transmit a signal to activate a beaconing function of the beacon tag 104 or reactivate a previously deactivated function (506). At a later time, the infrastructure may receive a message from another device, such as an access control card reader, indicating that a deactivated beacon tag has entered a designated area 106, 108. In response, the infrastructure may send a responsive command to a sensor or sensors in proximity to the point-of-entry by the beacon tag to the area 106, 108.

For general operation, the infrastructure of the system 100 may perform general operations in response to receiving a beacon from a sensor (508). The infrastructure may perform one or more beacon handling actions in response to receiving the beacon, such as identifying a tag associated with the received beacon, decrypting the beacon, parsing the beacon, and the like (510). The infrastructure may then process the data packet of the received beacon for local processing or send the data packet to another device of the system 100, such as a sensor 110, the sensor hub 112, or a gateway 114, for processing. For some embodiments, the infrastructure may also collect additional data from another device of the system 100, such as a sensor 110, the sensor hub 112, or a gateway 114 (512).

The infrastructure may identify tag characteristics for the identified tag based on the beacon (i.e., data packet) and/or the collected additional data (514). The infrastructure may identify the tag characteristics (514) in response to receiving the beacon, whether directly upon receiving the beacon (508) or indirectly as a result of a subsequent action (510, 512). Examples of a tag characteristic include, but are not limited to, speed and location. For some embodiments, the tag characteristic may include one or more of the following: a tag location within a proximal range of a designated area, a tag location outside of a proximal range of the designated location, tag motion below a threshold motion level, or tag power below a threshold power level. For some embodiments, the infrastructure may identify a special type beacon tag or person/asset associated with the beacon tag, such as a key person of an organization or event, or critical equipment for a health, financial, or government facility. For example, a special type may include a ventilator, oxygen tank, or defibrillator for a hospital.

In identifying one or more tag characteristics (514), the infrastructure of the system 100 may receive an internal motion signal (internal to the beacon tag) from the beacon tag, receive an external motion signal (external to the beacon tag) from another component of the infrastructure or device of the system, or a combination of these signals. For some embodiments, a component of the infrastructure or device of the system 100 may determine and provide motion information associated with one or more beacon tags. For some embodiments, a beacon tag may determine its motion based on an internal motion sensor and provide the motion information to the infrastructure.

In response to identifying one or more tag characteristics (514), the infrastructure may determine whether a tag instruction is to be included with an acknowledgment of the beacon (518). If the infrastructure determines that a tag instruction is to be included (518), then the infrastructure generates the tag instruction and the acknowledgment is transmitted to the appropriate tag beacon with the included tag instruction (522) in response to generating the tag instruction. If the infrastructure determines that any type of tag instruction is not to be included (518), then the infrastructure transmits the acknowledgment to the appropriate tag beacon (522) in response to the determination. Examples of a tag instruction may include, but is not limited to, a beaconing rate of the beacon tag or an indication of the beaconing rate. For some embodiments, the tag instruction may include a priority indication to increase the capability of locating and/or tracking a beacon tag identified as a special type above other tags. Thereafter, the infrastructure may return to a previous part of the system operation 500 (such as (502) or (508)) or proceed with a different action outside of the operation.

Figure 6:
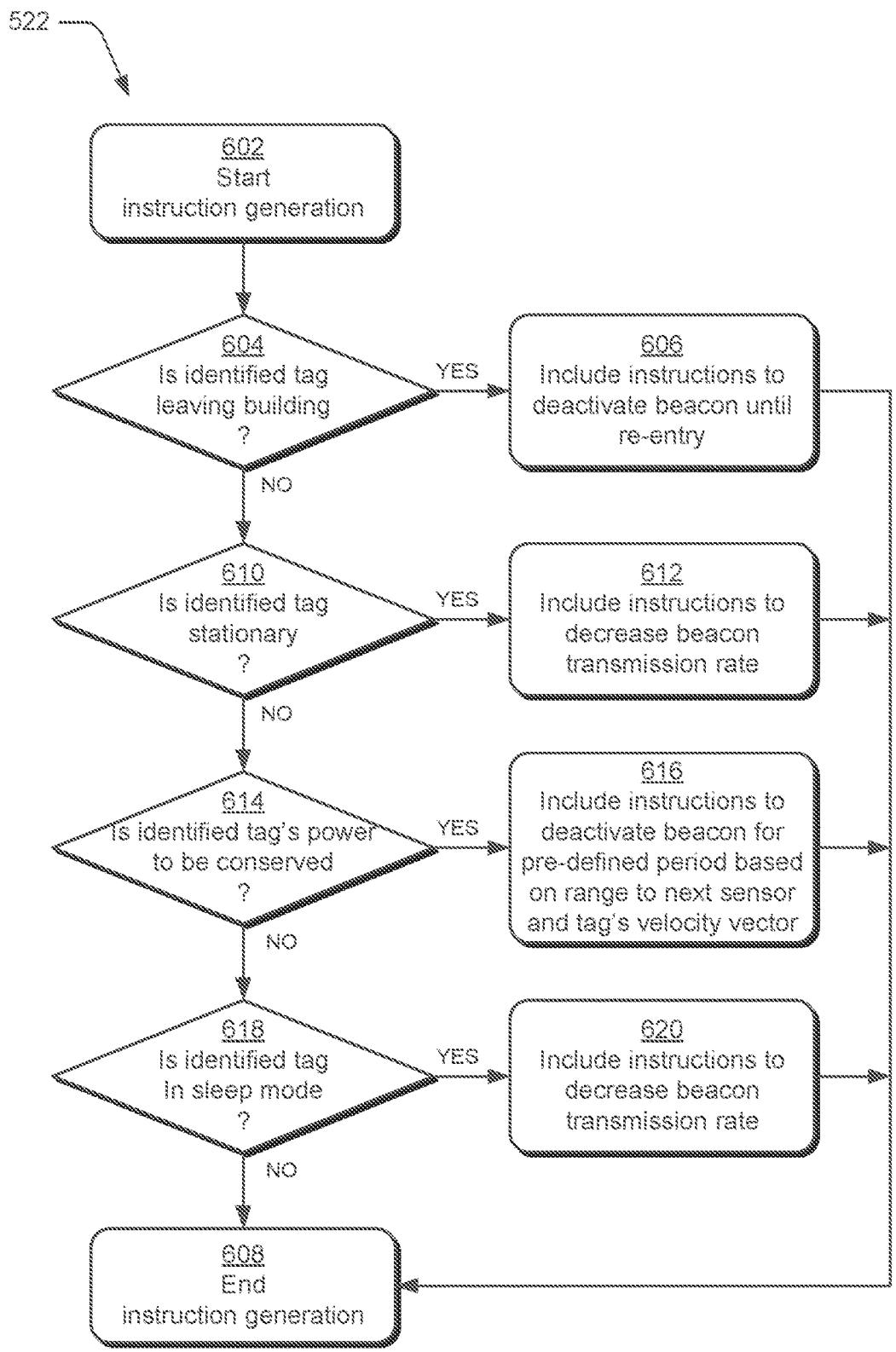
FIG. 6 is a flow diagram of an example implementation of the instruction generation operation of FIG. 5.

Referring to FIG. 6, there is illustrated an example implementation 600 of the instruction generation operation (520) of FIG. 5. This example implementation 600 depicts possible actions performed in response to tag characteristics associated location, motion, and tag power, but it is to be understood that the instruction generation operation (520) may include a wide variety of different implementations and is not restricted to the example implementation. For example, the instruction generation operation (520) may include one, two, all three tag characteristics depicted in FIG. 6, or one or more other tag characteristics not depicted in FIG. 6.

Initially, the instruction generation operation may start (602) in response to identification of tag characteristics (514) or determination of whether instructions are to be included with the acknowledgment (518). For one embodiment of a tag characteristic, the infrastructure may determine based on data received by a communication component and/or motion sensor that a particular beacon tag is moving beyond a designated area (604). For example, the infrastructure may determine that the beacon tag is leaving a building. In response to determining movement beyond the area (604), the infrastructure may generate a tag instruction to reduce or deactivate a beaconing function of the beacon tag for a particular time period or until re-entry to the area (606). In this manner, the infrastructure may command the beacon tag to minimize energy consumption by transmission while outside the area. At a later time, the infrastructure detect that the beacon tag is re-entering the area, such as detecting an access entry by a portal reader of the system 100 and commanding the beacon tag activate its beaconing function for communication with one or more fixed sensors near the entry point.

For another embodiment of a tag characteristic, the infrastructure may determine that the motion of a beacon tag is less than a motion threshold (610). In response to determining the lack of motion, the infrastructure may generate a tag instruction to decrease the beaconing rate (612), for a period of time or until a condition changes, to minimize power consumption and improve performance. For example, the tag instruction may indicate that the beacon tag should transmit once every predetermine time period (such as 10 seconds) until the beacon tag detects motion by its internal motion detector. Regarding performance, the infrastructure is more likely to receive beacon signals, including low power signals, from the respective beacon tag and acknowledge the received signal. For some embodiments, the beacon tag may pause its beaconing rate and refrain from transmitting again if detection motion is below the motion threshold. For some embodiments, the beaconing rate may decrease if the current beacon received by the tag is similar to a previous beacon received by the beacon tag, i.e., the most recently received previous beacon (inferring that the tag is stationary). The slow rate may be implemented by maintaining a short list of a predetermined number of readings or limiting the ceiling grid beaconing to be sparse. For some embodiments, the beaconing rate may increase if the current beacon received by the tag is different from the previous beacon received (inferring that the tag is moving).

For yet another embodiment of a tag characteristic, the infrastructure may determine the power level of the beacon tag is to be conserved (614). For example, the power level of the beacon tag may be below a predetermined power threshold. In response to determining the low power level, the infrastructure may generate a tag instruction to pause the beaconing rate of the beacon tag and refrain from transmitting again until a timer is triggered or a signal is received to awaken the respective beacon tag (616). For example, the timer or signal based on a predicted range of a next pre-defined sensor. For some embodiments, the infrastructure may determine a speed of a given beacon tag based on an external motion signal, such as data/signals received from one or more fixed sensors. If the infrastructure determines that the speed of the beacon tag is at or over a threshold speed, the infrastructure may provide a tag instruction to the given beacon tag to increase its beaconing rate, for a pre-defined period or until a condition changes. As a result, the beacon tag traveling at the given speed may transmit a sufficient number of beacon signal transmissions to be "heard" by a next fixed sensor. A fast moving beacon tag may be effectively located and tracked through the facility without having to periodically transmit at a fixed rate. The beacon tag conserves energy while enhancing the ability of the system 100 to accurately locate and continue to track the beacon tag, even at a low power level.

For still another embodiment of a tag characteristic, the infrastructure may determine that the motion of a beacon tag is less than a status threshold (618). In response to identifying a sleep mode, the infrastructure may generate a tag instruction to decrease the beaconing rate (620), for a period of time or until a condition changes, to minimize power consumption and improve performance, similar to the rate adjustment for a stationary tag (612). For example, the tag instruction may indicate that the beacon tag should pause transmissions or transmit once every predetermine time period (such as 10 seconds) until the beacon tag receives a status change from a processor or communication component of the beacon tag.

Upon completion of the instruction generation operation (524), the infrastructure may return to general operation of the example system operation 500 of FIG. 5 to transmit the acknowledgment with the generated instruction (522).

Figure 7:
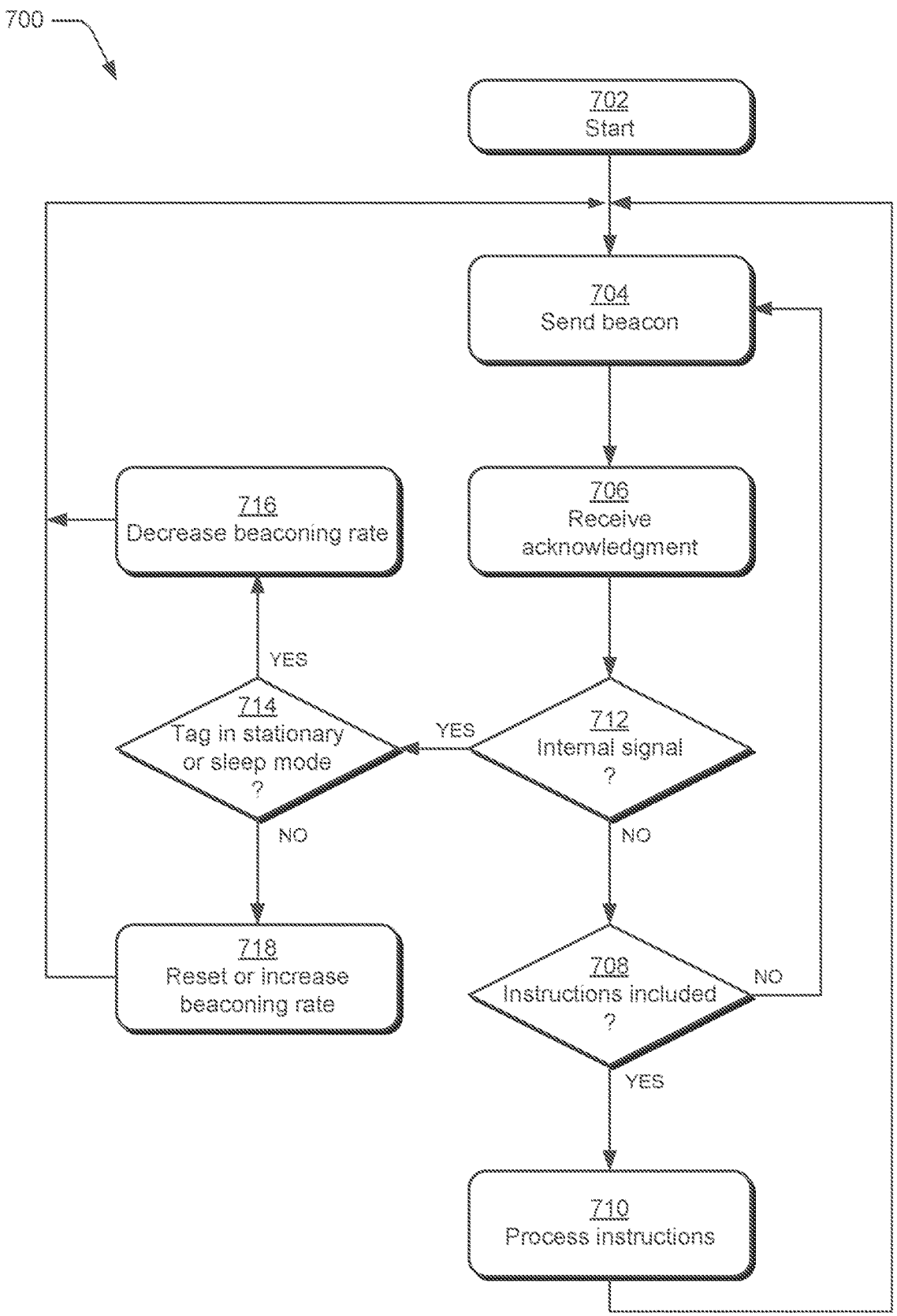
FIG. 7 is a flow diagram of an example implementation of a beacon tag operation.

Referring to FIG. 7, there is shown a flow diagram representing an example tag operation 700 of a beacon tag 104 for operating with a tracking system 100. The tag operation 700 may be initiated by commissioning, operation, other activation by a device, system, or entity (702). The beacon tag 104 may transmits a first beacon from a communication component 404 of the beacon tag (704) and receive an acknowledgment associated with the beacon at the communication component (706).

In response to receiving the acknowledgment (706), the beacon tag identifies a tag instruction of the acknowledgment (708). If a tag instruction based on the acknowledgment is not identified, then the beacon tag continues its process of transmitting beacons (704). If a tag instruction is identified, then the beacon tag processes the tag instruction (710) before continuing its process of transmitting beacons (704). The tag instruction includes a beaconing rate of the beacon tag. For some embodiments, the tag instruction is based on, but not limited to, one or more of the following: a tag location within a proximal range of a designated area, a tag location outside of a proximal range of the designated location, a tag motion below a threshold motion level, or a tag power below a threshold power level. In processing the tag instruction (710), the beacon tag adjusts the beaconing rate of the beacon tag based on the tag instruction. For those situations where the beacon tag adjust the beaconing rate, the beacon tag transmits a second beacon from the beacon tag based on the adjusted beaconing rate. For example, the first beacon is transmitted based on a first beaconing rate, the beacon tag generates or adjusts a second beaconing rate that is greater or less than the first beaconing rate based on the tag instruction, and the second beacon is transmitted based on the second beaconing rate.

For some embodiments, the beacon tag may monitor its motion or mode based on an internal signal separately from the instructions included in the acknowledgment (712). For such embodiments, the beacon tag may receive an internal motion signal from an internal motion sensor, such as an accelerometer, of the beacon tag. For some embodiments, the beacon tag may receive an internal status signal from a processor or communication component of the beacon tag. The beacon tag may determine whether the internal motion signal is less than an internal motion threshold (714). If the signal is less than the threshold (714) representing that the beacon tag is stationary or in sleep mode, then the beacon tag may decrease its beaconing rate (716) to minimize power consumption. If the signal is not less than the threshold (714) representing that the beacon tag is not stationary or not in sleep mode, then the beacon tag may maintain, increase, or reset to a default level its beaconing rate (718). In either case, the beacon tag may return to its beaconing process (704) or await another internal or external signal.

Figure 8:
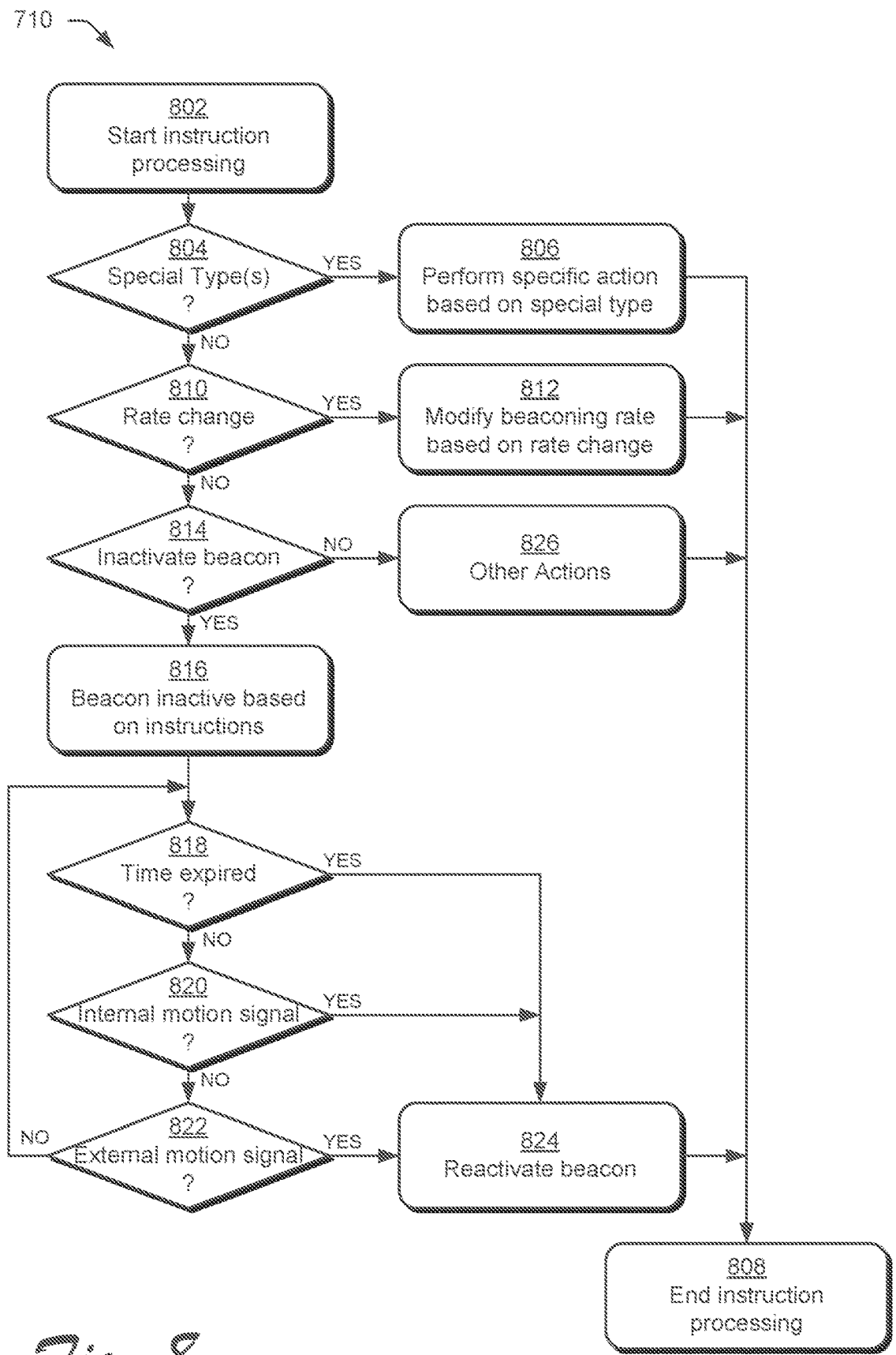
FIG. 8 is a flow diagram an example implementation of the instruction processing operation of FIG. 7.

Referring to FIG. 8, there is illustrated an example implementation 800 of the instruction processing operation (710) of FIG. 7. This example implementation 800 depicts possible actions performed in response to tag instructions received from an infrastructure (such as a sensor 110, sensor hub 112, and/or gateway 114) of the system 100, but it is to be understood that the instruction processing operation (710) may include a wide variety of different implementations and is not restricted to the example implementation. For example, the instruction processing operation (710) may include one or multiple tag instructions depicted in FIG. 7, or one or more other tag instructions not depicted in FIG. 7.

Initially, the instruction processing operation may start (802) in response to identifies a tag instruction of the acknowledgment (708). For one embodiment of the tag instruction, the beacon tag may determine whether in the tag instruction includes a special type (804). In response to identifying a special type (804), the beacon tag may perform an action that is specific to the special type (806). For example, the beacon tag may adjust or otherwise modify the beaconing rate in accordance with the special type. For example, the beaconing rate of an entity or equipment associated with the special type may be higher than other entities or equipment to provide a higher priority to them. Examples of such entities or equipment include, but are not limited to, a key person of an organization or event, or critical equipment for a health, financial, or government facility, such as a ventilator, oxygen tank, or defibrillator for a hospital. After performing the specific action (806), the beacon tag may complete the instruction processing operation (808) and continue its process of transmitting beacons (704).

For another embodiment of the tag instruction, the beacon tag may determine whether in the tag instruction includes a rate change (810). In response to identifying a rate change (810), the beacon tag may adjust or otherwise modify the beaconing rate of the beacon tag based on the rate change (812). After adjusting or modifying the beaconing rate (812), the beacon tag may complete the instruction processing operation (808) and continue its process of transmitting beacons (704).

For yet another embodiment of the tag instruction, the beacon tag may determine whether in the tag instruction includes a beaconing inactivation (814). In response to identifying a beaconing inactivation (814), the beacon tag may inactivate its beaconing function based on the tag instruction, thus pausing transmissions and maintaining an inactive state (816). Minimizing energy consumption by the beacon tag may be accomplished by adjusting the beaconing rate, and the beaconing rate with the lowest energy consumption is beacon inactivation. In order to minimize disruptions are adverse effects to performance, the beacon tag, the infrastructure of the system 100, or a combination of the beacon tag and the infrastructure manage the re-activation of the beaconing function. Re-activation of the beaconing function may be based on, but not limited to, one or more of a time period monitored by a timer of the beacon tag (818), an internal motion signal provided by a motion sensor of the tag (820), or an external motion signal provided by the tag instruction (822).

For one embodiment of the re-activation process, the beacon tag may include a timer to determine whether a predetermine time period has expired for maintaining the beaconing the inactive state (818). When the predetermined time period has expired, the beacon tag may re-activate its beaconing function (824). After re-activating the beaconing function (824), the beacon tag may complete the instruction processing operation (808) and continue its process of transmitting beacons (704).

For another embodiment of the re-activation process, the beacon tag may include an internal motion sensor, such as an accelerometer, and receive an internal motion signal from the sensor (820). For example, the beacon tag may inactivate the beaconing function if the internal motion signal is below the motion threshold and re-activate the beaconing function (824) if the internal motion signal is no longer below the motion threshold. After re-activating the beaconing function (824), the beacon tag may complete the instruction processing operation (808) and continue its process of transmitting beacons (704).

For yet another embodiment of the re-activation process, the beacon tag may include a communication component and receive an external motion signal from the infrastructure of the system 100. For example, a first tag instruction to inactivate beaconing may be received in response to the infrastructure determining that the beacon tag is transmitting from outside any designated area. Thereafter, the beacon tag may receive a second tag instruction in response to the infrastructure determining that the beacon tag is linked to an access entry control system, indicating the beacon tag is re-entering a designated area. As another example, the tag instruction from the infrastructure may indicate that significant movement of the beacon tag has been detected by one or more sensors. Accordingly, the beacon tag may re-activate the beaconing function (824) in response to receiving the external motion signal. After re-activating the beaconing function (824), the beacon tag may complete the instruction processing operation (808) and continue its process of transmitting beacons (704).

It is to be noted that other embodiments of the tag instruction and/or re-activation process (826) may be applied or otherwise incorporated into the example implementation 800.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A system for tracking beacon tags comprising:
    a communication component configured to receive a beacon from a beacon tag; and
    a processor coupled to the communication component, the processor identifying a tag characteristic associated with the beacon tag in response to receiving the beacon and generates a tag instruction based on the tag characteristic, wherein the tag characteristic includes at least one of a tag location outside of a proximal range of an indoor structure or a tag power below a threshold power level, wherein the tag instruction includes a beaconing rate for the beacon tag,
    wherein the communication component transmits an acknowledgment of the beacon, the acknowledgment including the tag instruction.

2. The system as described in claim 1, wherein the processor identifies the tag characteristic based on the beacon.

3. The system as described in claim 1, wherein:
    the communication component collects data from at least one infrastructure device; and
    the processor identifies the tag characteristic based on the data.

4. A method for tracking beacon tags comprising:
    receiving a beacon from a beacon tag;
    identifying a tag characteristic associated with the beacon tag in response to receiving the beacon, wherein the tag characteristic includes at least one of a tag location outside of a proximal range of an indoor structure or tag power below a threshold power level;
    generating a tag instruction based on the tag characteristic, wherein the tag instruction includes a beaconing rate for the beacon tag; and
    transmitting an acknowledgment of the beacon, the acknowledgment including the tag instruction.

5. The method as described in claim 4, wherein identifying the tag characteristic include identifying the tag characteristic based on the beacon.

6. The method as described in claim 4, further comprising collecting data from at least one infrastructure device, wherein identifying the tag characteristic includes identifying the tag characteristic based on the data.

7. A beacon tag for operating with a tracking system comprising:
    a communication component configured to transmit a first beacon and receive an acknowledgment associated with the beacon; and
    a processor coupled to the communication component, the processor identifying a tag instruction of the acknowledgment in response to receiving the acknowledgment and adjusting a beaconing rate of the beacon tag based on the tag instruction, wherein the tag instruction is based on at least one of a tag location outside of a proximal range of an indoor structure or a tag power below a threshold power level,
    wherein the communication component transmits a second beacon from the beacon tag based on the adjusted beaconing rate.

8. The beacon tag as described in claim 7, wherein
    the communication component transmits the first beacon based on a first beaconing rate;
    the processor adjusts the beaconing rate by generating a second beaconing rate that is greater or less than the first beaconing rate based on the tag instruction; and
    the communication component transmits the second beacon based on the second beaconing rate.

9. The beacon tag as described in claim 7, wherein the processor adjusts the beaconing rate by minimizing the beaconing rate based on at least one of a time period monitored by a timer of the tag, an internal motion signal provided by a motion sensor of the tag, or an external motion signal provided by the tag instruction.

10. The beacon tag as described in claim 7, wherein the tag instruction includes an indication of the beaconing rate of the beacon tag.

11. A method of a beacon tag for operating with a tracking system comprising:
    transmitting a first beacon from the beacon tag;
    receiving an acknowledgment associated with the beacon;
    identifying a tag instruction of the acknowledgment in response to receiving the acknowledgment, wherein the tag instruction is based on at least one of a tag location outside of a proximal range of an indoor structure or a tag power below a threshold power level;
    adjusting a beaconing rate of the beacon tag based on the tag instruction; and
    transmitting a second beacon from the beacon tag based on the adjusted beaconing rate.

12. The method as described in claim 11, wherein:
    the first beacon is transmitted based on a first beaconing rate;
    adjusting the beaconing rate includes generating a second beaconing rate that is greater or less than the first beaconing rate based on the tag instruction; and
    the second beacon is transmitted based on the second beaconing rate.

13. The method as described in claim 11, wherein adjusting the beaconing rate includes minimizing the beaconing rate based on at least one of a time period monitored by a timer of the tag, an internal motion signal provided by a motion sensor of the tag, or an external motion signal provided by the tag instruction.

14. The method as described in claim 11, wherein the tag instruction includes an indication of the beaconing rate of the beacon tag.

* * * * *